US008219913B2

(12) United States Patent
Terada (10) Patent No.: US 8,219,913 B2
(45) Date of Patent: Jul. 10, 2012

(54) PARAMETER SETTING APPARATUS PROVIDED WITH A DISPLAY UNIT HAVING A TOUCH SENSOR

(75) Inventor: Kotaro Terada, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1730 days.

(21) Appl. No.: 11/504,965

(22) Filed: Aug. 15, 2006

(65) Prior Publication Data

US 2007/0052687 A1  Mar. 8, 2007

(30) Foreign Application Priority Data

Sep. 5, 2005  (JP) ................................ 2005-256452

(51) Int. Cl.
*G06F 13/00* (2006.01)
*G06F 15/00* (2006.01)

(52) U.S. Cl. ...................................... 715/728; 715/722

(58) Field of Classification Search .................. 715/705, 715/708, 713–714, 760–764, 719–722, 726–728, 715/716
See application file for complete search history.

(56) References Cited

U.S. PATENT DOCUMENTS

| | | | |
|---|---|---|---|
| 6,281,885 B1 | 8/2001 | Eastty et al. | |
| 6,365,815 B2 * | 4/2002 | Ishida | 84/478 |
| 6,747,678 B1 * | 6/2004 | Katayama et al. | 715/773 |
| 6,801,222 B1 * | 10/2004 | Dunham et al. | 715/714 |
| 6,862,712 B1 | 3/2005 | Nakagawa et al. | |
| 7,380,250 B2 * | 5/2008 | Schechter et al. | 719/328 |

FOREIGN PATENT DOCUMENTS

JP   2000-259306 A   9/2000

OTHER PUBLICATIONS

Yamaha Digital Mixing console M&CL owner's manual, 2005, pp. 1-25.*
Office Action mailed Jul. 6, 2010, for JP Application No. 2005-256452, with Partial English Translation, three pages.

* cited by examiner

*Primary Examiner* — Cao "Kevin" Nguyen
(74) *Attorney, Agent, or Firm* — Morrison & Foerster LLP (57) ABSTRACT

When it is determined on the basis of the output from a touch sensor of a touch screen 5 that a touch operation is started in the area of one on/off button displayed on a display screen of the touch screen 5, the on/off state of an on/off parameter assigned to the one on/off button is reversed. When it is determined that the touched position has moved to the area of another on/off button with the touch being maintained, an on/off parameter assigned to the another on/off button is set to the same on/off state as that of the on/off parameter assigned to the one on/off button in which the touch operation has been started. Users are allowed to simultaneously set respective on/off states of on/off parameters assigned to on/off buttons by a single touch operation on the touch screen 5.

5 Claims, 4 Drawing Sheets

(a) occurrence of touch start event
(b) occurrence of touch move event
(c) occurrence of touch move event
(d) occurrence of touch finish event

FIG.6 mode buttons $71_1 \sim 71_8$
stereo buttons $72_1 \sim 72_8$
mono buttons $73_1 \sim 73_8$
pan knobs $74_1 \sim 74_8$
LCR buttons $75_1 \sim 75_8$
CSR knobs $76_1 \sim 76_8$

PARAMETER SETTING APPARATUS PROVIDED WITH A DISPLAY UNIT HAVING A TOUCH SENSOR

BACKGROUND OF THE INVENTION

1. Field of the Invention

The present invention relates to a parameter setting apparatus provided with a display unit having a touch screen. The present invention also relates to a computer program and a parameter setting method applied to the parameter setting apparatus.

2. Description of the Related Art

Conventionally, many digital audio mixers and electronic musical instruments have employed an apparatus for setting parameters using a touch screen (also referred to as a touch panel). A touch screen is an input/output apparatus for displaying images as well as sensing touch of a finger, stylus or the like on a display screen and the position of the touch operation. On the touch screen, operators are displayed to allow a user to touch the display area of an operator with his finger, resulting in the value of a parameter assigned to the operator being input in accordance with the movement of the finger. In a case where the operators are on/off buttons, each touch on the on/off button with a finger or the like reverses the on/off state of the on/off parameter assigned to the on/off button.

Parameter setting through the use of the touch screen is easy for a user to operate. When compared with cases where a mouse having switches is used, however, the touch screen allows the user to recognize his touch operations only through the sounds of touches and changes of display screen. As a result, it is quite burdensome for the user to touch every single on/off button to reverse the on/off state of on/off parameters assigned to the on/off buttons without fault. In many cases, in addition, on the display screen, various types of on/off buttons are displayed altogether. In other words, on/off buttons adjacent to an on/off button which the user has touched to operate are not necessarily those the user desires to operate. In those cases, it is difficult for the user to negotiate around unnecessary buttons and touch only his desired on/off buttons.

SUMMARY OF THE INVENTION

The present invention was accomplished to solve the above-described problems, and an object thereof is to provide a parameter setting apparatus provided with a display unit having a touch sensor for sensing a touch operation on a display screen and the touched position, the parameter setting apparatus allowing a user to simultaneously set respective on/off states of on/off parameters assigned to on/off buttons by a single touch operation.

A feature of the parameter setting apparatus according to the invention is to include an image outputting portion for outputting, to the display unit, an image on which a plurality of on/off buttons to each of which an on/off parameter is assigned are displayed; an on/off parameter setting portion for reversing, when it is determined on the basis of output from the touch sensor that the touch operation has been started in an area of any one of the on/off buttons displayed on the display screen by the image outputting portion, on/off state of the on/off parameter assigned to the one on/off button; and an on/off parameter copying portion for setting, when it is determined on the basis of output from the touch sensor that, after the start of the touch operation, the touched position has moved to an area of another on/off button displayed on the display screen with the touch on the display screen being maintained, on/off state of the on/off parameter assigned to the another on/off button to the same on/off state as that of the on/off parameter assigned to the one on/off button in the area of which the touch operation has been started. In this case, the parameter setting apparatus is applied, for example, to an audio mixer that mixes a plurality of audio signals and outputs the mixed signals.

The above-described parameter setting apparatus allows the user to set a plurality of on/off parameters by a single dragging operation (the user touches one on/off button on a screen with his finger and then moves his finger to another on/off button with his finger keeping touching the screen).

Another feature of the invention is that each of the on/off buttons belongs to any one of groups provided according to types of the parameters; and the on/off parameter copying portion sets, on condition that the another on/off button belongs to the same group as the one on/off button in the area of which the touch operation has been started, on/off state of the on/off parameter assigned to the another on/off button to the same on/off state as that of the on/off parameter assigned to the one on/off button in the area of which the touch operation has been started. The feature allows the user to simultaneously set on/off parameters assigned to on/off buttons belonging to one group by a single dragging operation. During the dragging operation, even if the user drags over the area of an on/off button that does not belong to the same group, user's dragging operation does not affect the on/off state of the on/off parameter assigned to the on/off button.

Still another feature of the invention is that when on/off state of an on/off parameter is reversed, the image outputting portion outputs, to the display unit, an image in which display of on/off buttons is changed in accordance with the reversed on/off state. The feature facilitates user's visual recognition of reverse of the on/off state of the parameters.

The present invention can be embodied not only as an invention of the parameter setting apparatus but also as an invention of a computer program and a method applied to the parameter setting apparatus.

DESCRIPTION OF THE PREFERRED EMBODIMENT

Figure 1:
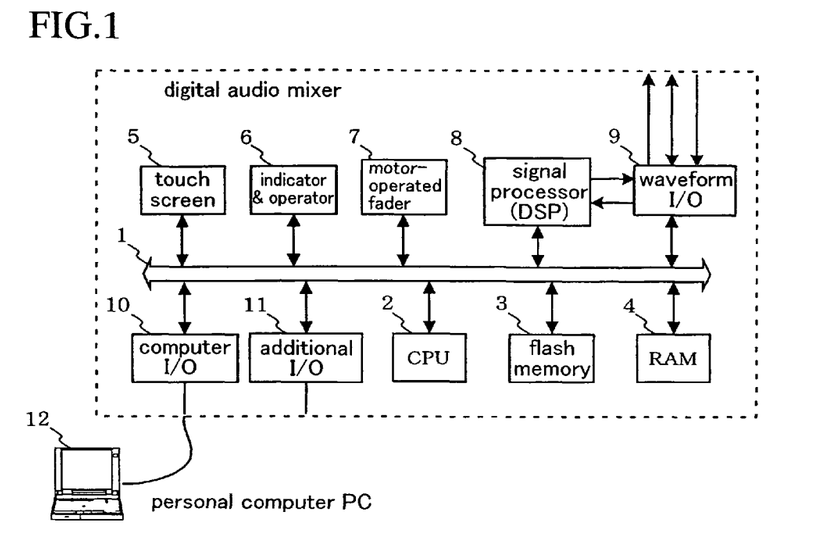
FIG. 1 is a block diagram showing an example hardware configuration of a digital audio mixer that implements an embodiment of the present invention.

FIG. 1 is a block diagram showing an example hardware configuration of a digital audio mixer to which an embodiment of the present invention is applied. The digital audio mixer has a bus 1, a CPU (Central Processing Unit) 2 and a flash memory 3. The flash memory 3 retains a control program and preset data even in a state where the power is turned off, keeping the retained control program and preset data rewritable. The CPU 2 executes the control program through the use of a RAM (Random Access Memory) 4 as its work area to implement an image outputting capability, an on/off parameter setting capability and an on/off parameter copying capability of the present invention. The CPU 2 also controls the whole digital audio mixer.

The digital audio mixer also includes a touch screen 5 and an indicator-and-operator 6. The indicator-and-operator 6 is composed of mechanical operators provided on an operating panel and indicators provided on the operators and the operating panel to indicate their operational status. Motor-operated faders 7 are provided for respective input channels and output channels to control gain parameter of the respective channels. In addition to manual operation of the faders 7, the knob of the respective faders 7 moves to a parameter setting value in accordance with the set value of their corresponding gain parameter. The digital audio mixer also includes a digital signal processor (DSP) 8 and a waveform input/output (I/O) interface 9.

The digital audio mixer also includes a computer input/output interface 10. In a case where an application for controlling the digital audio mixer is installed on a personal computer 12, the personal computer 12 is allowed to remote-control the digital audio mixer of the main unit. In a case where the personal computer 12 is a "Tablet PC", particularly, the personal computer 12 is provided with a touch screen. If a "parameter setting program" to which the present invention is applied is installed on the personal computer 12 having a touch screen, the present invention is realized. An additional input/output interface portion 11 connects the digital audio mixer with another digital audio mixer to realize mixing control (digital cascade) done by combined use of the two digital audio mixers.

In a current memory area provided in the RAM 4, current set values concerning capabilities of the entire digital audio mixer are stored. The set values of parameters for controlling the signal processor 8, which are set by operating the touch screen 5, the indicator-and-operator 6 and the motor-operated faders 7, are included in the current set values concerning capabilities of the entire digital audio mixer. The CPU 2 refreshes the display screen to reflect the touch of respective operators displayed on the touch screen. On refreshing the display screen, the CPU 2 also changes values of parameters assigned to the respective operators and writes the changed values into the current memory area. In accordance with the set values retained in the current memory area, the CPU 2 transfers control data for signal processing such as multiplication factor to the signal processor 8. In accordance with the user's touch of the operators displayed on the touch screen 5, as a result, the signal processor 8 controls mixing and characteristics of audio signals of a plurality of channels externally input through the waveform input/output interface 9. The signal processor 8 then outputs the audio signals to the outside through the waveform input/output interface 9. What the signal processor 8 performs may be done by a signal processing program executed by the CPU 2.

Figure 2:
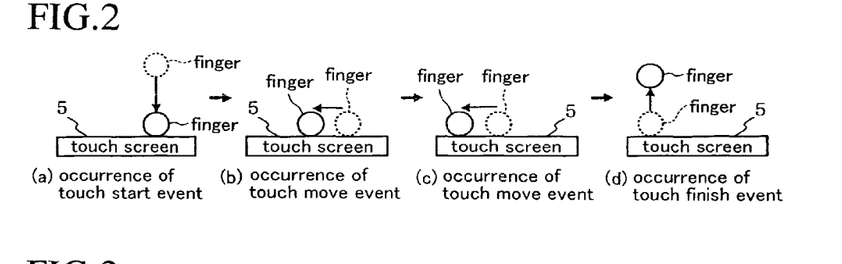
FIG. 2 is an explanatory drawing showing a process in which a CPU shown in FIG. 1 detects operation of a touch screen.

FIG. 2 shows detection of the operation of the touch screen 5 by the CPU 2 shown in FIG. 1. The touch screen 5 detects whether a touch of a finger or the like has been made or not. If a touch has been detected, the touch screen 5 figures out coordinates of the touched position. The CPU 2 accesses the touch screen 5 at given interrupt timings. As shown in FIG. 2(*a*), a user places his finger on the touch screen 5. The CPU 2 inputs the detected touch and data on coordinates of the touched position. Since previously input data indicates no touch has been made, a touch start event is triggered. As shown in FIG. 2(*b*), the user then moves his finger, keeping his finger touching the touch screen (referred to as dragging operation as in the case of mouse controller). The CPU 2 inputs the detected touch and data on coordinates of the position of the touch. Since the previous input shown in FIG. 2(*a*) also indicates data indicative of a detected touch, a touch move event is triggered.

As shown in FIG. 2(*c*), the user keeps dragging his finger. The CPU 2 inputs the detected touch and data on coordinates of the position of the touch. Since the previous input shown in FIG. 2(*b*) also indicates data indicative of a detected touch, the touch move event is triggered again. As long as a finger is kept dragging, the touch move event is repeatedly triggered. As shown in FIG. 2(*d*), the user then moves his finger off the touch screen. The CPU 2 inputs data indicative of no touch. Since the previous input indicates data indicative of a detected touch, a touch finish event is triggered.

Conventional parameter setting apparatuses which use a touch screen have an image outputting capability and an on/off parameter setting capability. The image outputting capability enables output, to the display unit of the touch screen 5, of an image in which a plurality of on/off buttons to each of which an on/off parameter is assigned are to be shown. The on/off parameter setting capability reverses the on/off state of a parameter assigned to an on/off button if a touch starts in the area of the on/off button, and the touch finishes in the area of the on/off button. In a case where a user desires to set a plurality of on/off parameters, the conventional apparatuses requires the user to repeat the setting procedure for respective on/off buttons.

An embodiment of the present invention has the same image outputting capability as that of the conventional apparatuses. However, a parameter setting capability according to the embodiment of the present invention is different from that of the conventional apparatuses. More specifically, assume that a user has started touching (operating) the area of any one of the on/off buttons displayed, by use of the image outputting capability, on a display screen of the touch screen 5. In this case, when the user's touch is recognized on the basis of the output of a touch sensor, the on/off state of the on/off parameter assigned to the one on/off button is reversed. In other words, the user's first action directly affects the setting of the parameter.

Assume that the user then moves his finger to the area of another on/off button displayed, by use of the image outputting capability, on the display screen of the touch screen 5, keeping his finger contacting with the display screen. In this case, if the move is recognized on the basis of the output of the touch sensor, the on/off parameter assigned to the another on/off button is set to the same on/off state as that of the on/off parameter assigned to the one on/off button in the area of which the start of the touch was recognized. This capability is especially referred to as an on/off parameter copying capability. As a result, user's dragging operation reverses the on/off state of the on/off parameter of an on/off button which the user has touched first and also turns the on/off state of the on/off parameter of another on/off button to the same on/off state as the first on/off button. Although the values of the on/off parameters may be arbitrarily decided, the on state may be indicated by "1" with the off state being indicated by "0".

In many cases, the touch screen also displays not only the on/off buttons but also other types of operators such as buttons for selecting parameters except the on/off parameters, knobs for gradually switching values of parameters, buttons for switching operating screens, etc. Even if the user drags to the areas of these other types of operators, however, the parameters assigned to the other types of the operators will not be affected. Therefore, the user can drag without concern for the areas of these types of operators that are different from the on/off buttons.

In other cases, a plurality of on/off buttons which are classified into groups according to the types of the on/off parameters are displayed on the touch screen. The image outputting capability outputs, to the display unit, an image in which on/off buttons each having an on/off parameter and belonging to one of the groups classified according to the type of the on/off parameter are to be displayed. Assume that the user starts touching the area of one on/off button displayed, by use of the image outputting capability, on the display screen of the touch screen 5. In this case, if the start of the touch is recognized on the basis of the output of the touch sensor, the on/off parameter setting capability reverses the on/off state of the on/off parameter assigned to the on/off button.

Assume that the user then moves his finger to the area of another on/off button displayed by the image outputting capability on the display screen of the touch screen 5, keeping his finger contacting with the display screen. In this case, if the move is recognized on the basis of output of the touch sensor, the on/off parameter copying capability sets the on/off state of the on/off parameter assigned to the another on/off button to the same on/off state as that of the on/off parameter assigned to the one on/off button in the area of which the start of the touch was recognized on condition that the another on/off button belongs to the same group as the one on/off button on which the start of the touch was recognized.

As a result, a user's action (dragging operation) in which the user's finger touches one on/off button and moves his finger to another on/off button belonging to the same group as the one on/off button with the touch being maintained reverses the on/off state of the one on/off button which the user has touched first, and also turns the on/off state of the on/off parameter of the another on/off button to the same on/off state as that of the one on/off button. Even if the user drags his finger through the area of an on/off button which does not belong to the same group, the dragging will not cause a change to the on/off parameter of the on/off button. Therefore, the user can drag his finger without concern for on/off buttons belonging to different groups.

Figure 3:
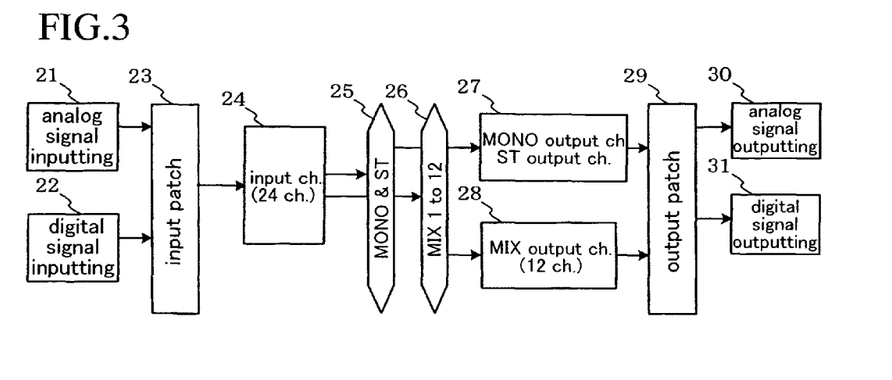
FIG. 3 is a block diagram showing functions of a signal processor and a waveform input/output interface shown in FIG. 1.

FIG. 3 is a block diagram showing functions of the signal processor 8 and the waveform input/output interface 9 shown in FIG. 1. The waveform input/output interface 9 corresponds to an analog signal inputting portion 21, a digital signal inputting portion 22, an analog signal outputting portion 30, and a digital signal outputting portion 31. The signal processor 8 corresponds to other blocks. The analog signal inputting portion 21 has a plurality of input ports for inputting analog signals in order to convert to digital signals. The digital signal inputting portion 22 has a plurality of input ports for inputting digital signals. Under the control of a patch control portion which is not shown, an input patch portion 23 selects one of the input ports of the analog signal inputting portion 21 and the digital signal inputting portion 22 for respective input channel portion 24$i$ (e.g., i indicative of 1st to 24th channel) to provide connection between the selected input port and the input channel portion 24$i$.

Each of the input channel portion 24$i$ controls characteristics of input signals, and selectively supplies output signals to at least one of a mono-and-stereo output bus 25 and a plurality of mix output buses 26 (e.g., 1 through 12 channels), the supplied signals being mixed at the bus. Signals mixed at the mono-and-stereo bus 25 are input to a mono-and-stereo output channel 27, while signals mixed at the plurality of mix output buses 26 are input to their corresponding one of a mix output channel portion 28 having a plurality of mix output channels (e.g., 1 to 12 channels).

Under the control of the patch control portion which is not shown, an output patch portion 29 selects one of the output channels of the mono-and-stereo output channel 27 and the mix output channel portion 28 for respective output ports contained in the analog signal output portion 30 and the digital signal output portion 31 to provide connection between the selected output channel of the mono-and-stereo output channel 27 and the mix output channel portion 28 and the output port. The analog signal output portion 30 converts digital signals supplied to the ports to analog signals by use of a digital-to-analog converter and outputs the converted signals. The digital signal output portion 31 directly outputs digital signals supplied to the ports.

Figure 4:
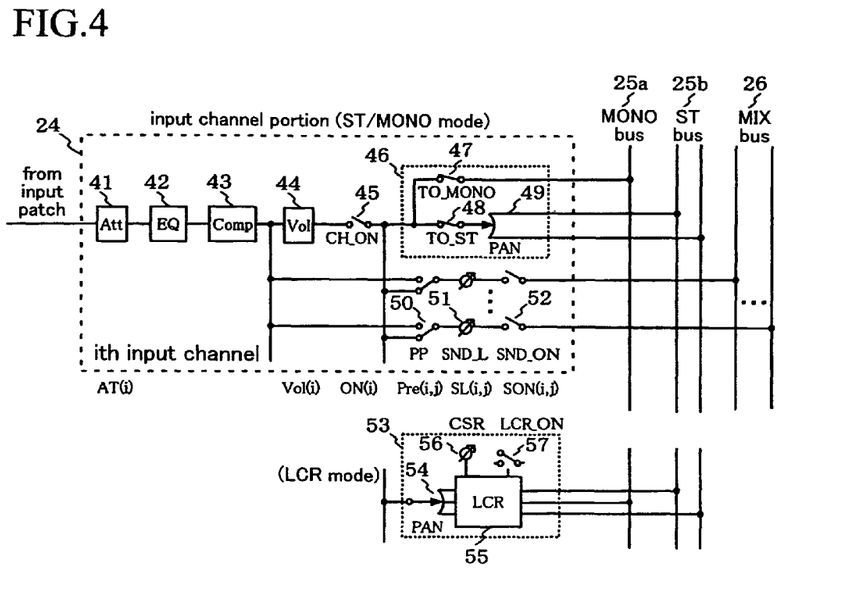
FIG. 4 is a block diagram showing details on the ith channel of an input channel portion shown in FIG. 3.

FIG. 4 is a block diagram showing details on the ith channel of the input channel portion 24 shown in FIG. 3. An attenuator 41 adjusts the level of input signals (parameter name AT(i)). An equalizer 42 adjusts the frequency response of the input signals. A compressor 43 senses the level of the signals and compresses the signals such that the gain at the input of large-signal decreases compared to the input of small-signal. A volume 44 adjusts input level (parameter name Vol(i)) through a fader operator. A channel-on switch 45 controls on/off of the supply of output signals of the input channel portion 24$i$ (parameter name ON(i)).

In a stereo-and-mono sending portion 46, furthermore, a "TO MONO" switch 47 controls on/off of the supply of output signals to a mono bus 25$a$, while a "TO ST" switch 48 controls on/off of the supply of output signals to a stereo bus 25$b$. A PAN regulator 49 regulates localization of sound image (pan). A sending-on switch 52 controls on/off of the supply of output signals to a mix bus ("j" indicative of 1 to 12) 26 (parameter name SON(i,j)). A sending level regulator 51 regulates sending level to the respective mix bus ("j" indicative of 1 to 12) 26 (parameter name SL(i,j)). In addition, the input channel portion 24 also includes a pre/post switch 50 for switching for direct connection from the compressor 43 to the sending level regulator 51 (parameter name Pre(i,j)). Of the two available connections, the connection to the output of the compressor 43 is referred to as connection to "pre side", for the connection is made before the volume 44 (fader) and the channel-on switch 45. The connection to the output of the channel-on switch 45 is referred to as connection to "post side", for the connection is made after the volume 44 (fader) and the channel-on switch 45.

The above-described stereo-and-mono sending portion 46 shows a case in which the ith channel of the input channel portion 24 is set to "stereo-and-mono mode" through the use of a mode switch which is not shown. In addition to the "stereo-and-mono mode", "LCR mode" is also available. In "LCR mode", signals for three channels of L/R channels and center "C" are sent to the stereo bus 25$b$ and the mono bus 25$a$. In the LCR mode, the stereo-and-mono sending portion 46 is replaced with an LCR sending portion 53 which is shown in the lower part of FIG. 4. In FIG. 4, the LCR sending portion 53 is conceptually illustrated. Detailed output distribution is described in Japanese Patent No. 3266045 (stereo system) which is incorporated in the present specification. Localization of sound image (pan) of the output of the channel-on switch 45 is regulated by a PAN regulator 54. The output of the channel-on switch 45 is then input to an LCR portion 55 to allow a CSR regulator 56 to regulate CSR (center/side ratio: level ratio of C channel with respect to L/R channels). An LCR switch 57 is a switch for switching on/off of LCR sending.

Figure 5:
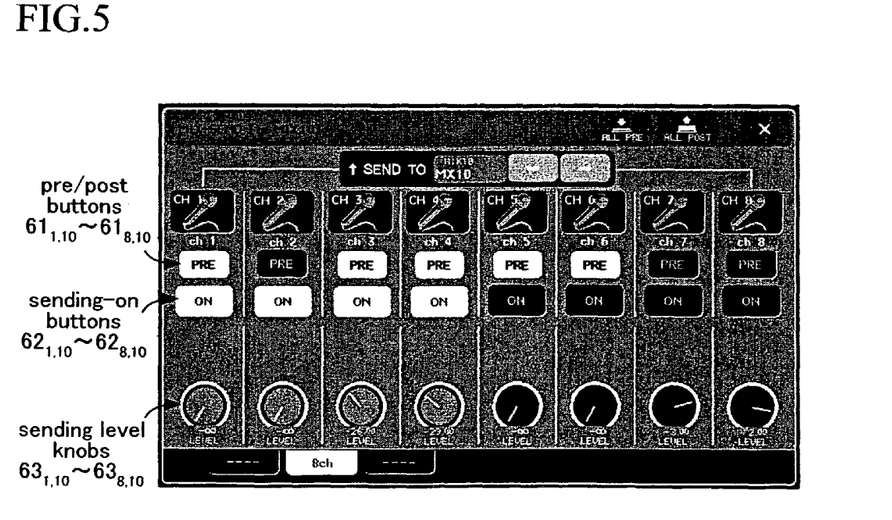
FIG. 5 is a drawing showing a first example of the touch screen provided for explanation of the embodiment of the present invention shown in FIG. 1.

FIG. 5 is a drawing showing the first example of the touch screen provided for explanation of the embodiment of the present invention shown in FIG. 1. FIG. 5 shows an operating touch screen corresponding to the sending portion which supplies output signals to the mix bus (1 through 12) 26 shown in FIG. 4. The touch screen provides at-a-glance display of the output from input channels (1) through (8) to a mix bus (10).

Pre/post buttons $61_{1,10}$ through $61_{8,10}$ are operators (display areas) corresponding to the pre/post switch 50 shown in FIG. 4, while sending-on buttons $62_{1,10}$ through $62_{8,10}$ correspond to the sending-on switch 52. Sending level knobs $63_{1,10}$ through $63_{8,10}$ correspond to the sending level regulator 51. The pre/post switch 50 provides two options to choose from. When viewed from a chosen option, however, on/off of the chosen side is controlled by the pre/post switch 50. In the input channel portion 24$i$, more specifically, when the pre/post button $61_{i,j}$ is set to "on", the pre/post switch 50 for the mix bus j is connected to the pre side. When the pre/post button $61_{i,j}$ is set to "off", on the other hand, the pre/post switch 50 is connected to the post side. In FIG. 5 as well as later-described FIG. 6, highlighted on/off buttons (toggle buttons) indicate that the corresponding switches are set to "on", while dimmed on/off buttons indicate that the corresponding switches are set to "off". In the actual embodiment, the buttons are displayed in color. As in the case of the sending-on buttons $62_{5,10}$ through $62_{8,10}$, the rotational angle and value of respective sending level knobs $63_{5,10}$ through $63_{8,10}$, which are associated with a sending level SL(i,j), are dimmed in order to reflect the "off" state of the sending-on switch 52 of their corresponding input channels. The rotational angle and value of the sending level knobs shown in FIG. 5, which are provided for purposes of illustration, do not necessarily represent actual settings.

Figure 6:
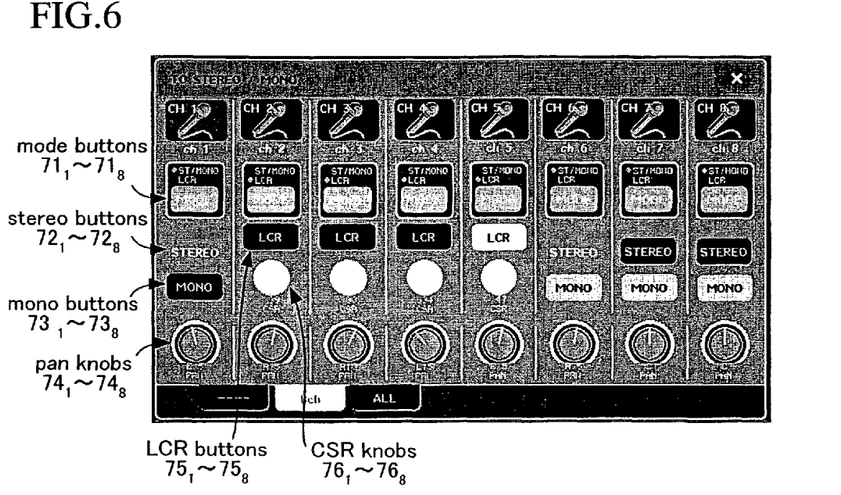
FIG. 6 is a drawing showing a second example of the touch screen provided for explanation of the embodiment of the present invention shown in FIG. 1.

FIG. 6 is a drawing showing the second example of the touch screen provided for explanation of the embodiment of the present invention shown in FIG. 1. FIG. 6 shows an operating touch screen corresponding to the stereo-and-mono sending portion 46 and the LCR sending portion 53 shown in FIG. 4. The touch screen provides at-a-glance display of the output from the input channels (1) through (8) to the mono-and-stereo bus 25. Mode buttons $71_1$ through $71_8$ are operators corresponding to a mode switch which is not shown in FIG. 4. The mode buttons $71_1$ through $71_8$ switch between the "stereo-and-mono mode" and the "LCR mode". The current mode of the respective mode buttons is indicated by an illuminated area of display lamps.

Stereo buttons $72_1$ through $72_8$ are operators (display areas) corresponding to the "TO ST" switch 48 shown in FIG. 4, while mono buttons $73_1$ through $73_8$ are operators (display areas) corresponding to the "TO MONO" switch 47. These buttons are provided only for the input channel (1) and input channels (6) to (8) which are in the "stereo-and-mono mode". LCR buttons $75_1$ through $75_8$ are operators corresponding to the LCR on/off switch 57, while CSR knobs $76_1$ through $76_8$ are operators corresponding to the CSR regulator 56 shown in FIG. 4. These buttons and knobs are provided only for the input channels (2) to (5) which are in the "LCR mode". Pan knobs $74_1$ through $74_8$ correspond to the PAN regulator 49 or the PAN regulator 54 shown in FIG. 4 in accordance with the mode of the respective channels. The rotational angle and value of the CSR knobs and the pan knobs shown in FIG. 6, which are provided for purposes of illustration, do not necessarily represent actual settings.

Figure 7:
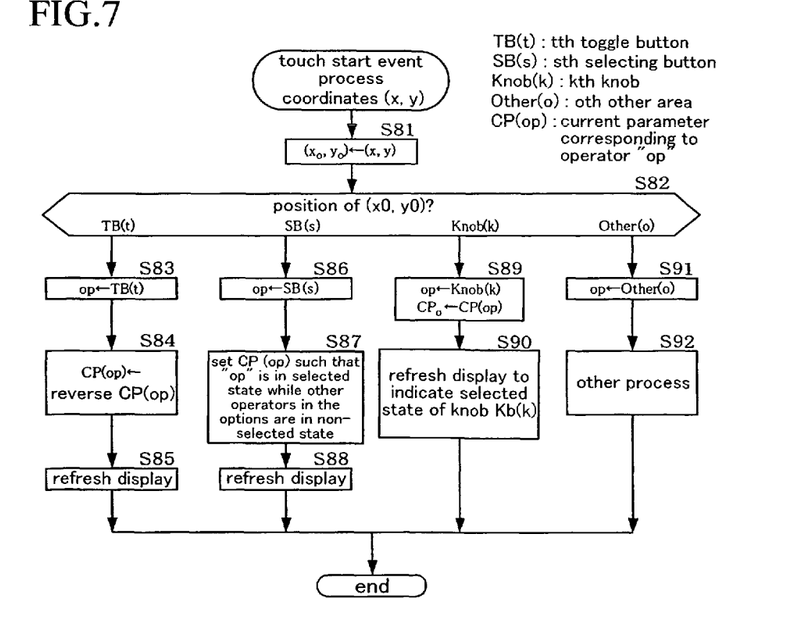
FIG. 7 is a flowchart of a touch start event process of the embodiment of the present invention shown in FIG. 1.
Figure 8:
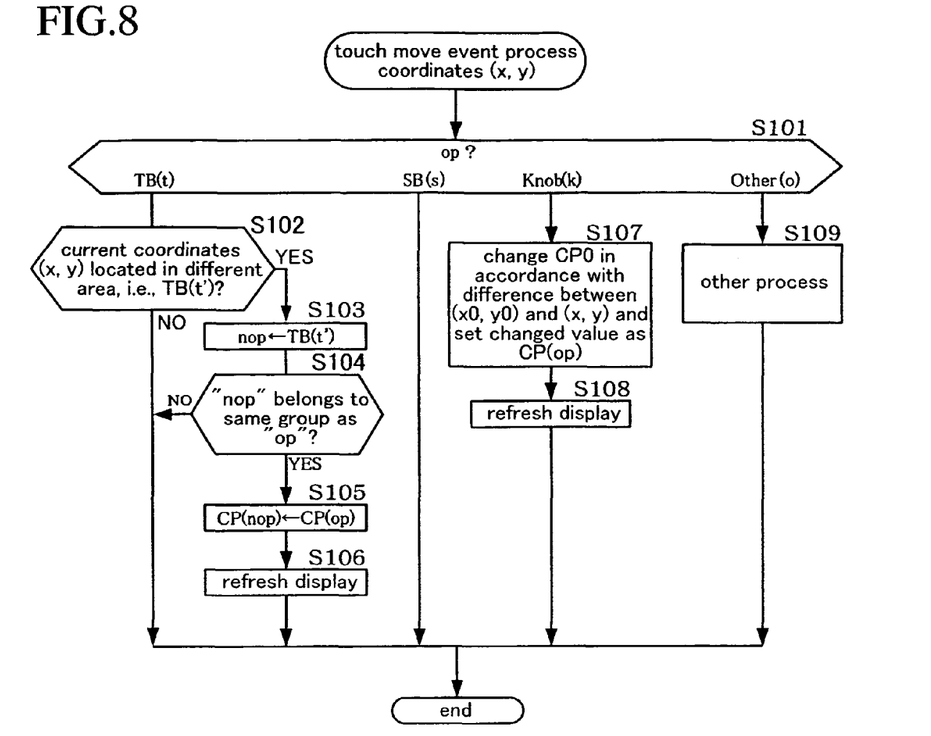
FIG. 8 is a flowchart of a touch move event process of the embodiment of the present invention shown in FIG. 1.
Figure 9:
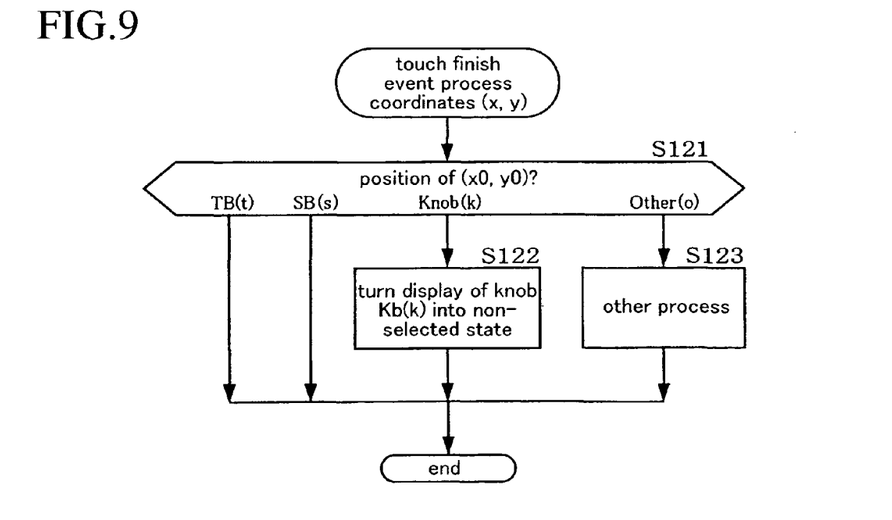
FIG. 9 is a flowchart of a touch finish event process of the embodiment of the present invention shown in FIG. 1.

FIGS. 7 through 9 are flowcharts showing operations of the embodiment of the present invention shown in FIG. 1. Respective steps are performed by the CPU 2 shown in FIG. 1 by use of a parameter setting program. FIG. 7 is a flowchart showing a touch start event process. The process is started upon detection of occurrence of a touch start event shown in FIG. 2(a) to input coordinates (x, y) of a touched position from the touch screen 5 shown in FIG. 1. At S81, the coordinates (x, y) are stored in a register for start coordinates ($x_0$, $y_0$). Step S82 determines which operator corresponds to the display area in which the start coordinates ($x_0$, $y_0$) are located.

When the position of the start coordinates ($x_0$, $y_0$) is in the display area of the tth toggle button TB(t) (equivalent to an on/off button), a process for updating a parameter value is immediately performed. More specifically, the flow proceeds to S83 to store TB(t) in a register for a currently operated operator "op". The flow then proceeds to S84 to reverse the on/off state of a parameter CP (op) stored in the register. At S84, the reversed parameter CP (op) is stored in the register again. Then at S85, the display of the toggle button TB(t) is refreshed to reflect the value of the register. In some cases such as the mode button $71_i$ shown in FIG. 6, the reverse causes switching of the display of other buttons such as switching from the stereo button $73_i$ to the LCR button $75_i$ and CSR knob $76_i$, and vice versa.

When the start coordinates ($x_0$, $y_0$) are located in the display area of the sth selecting button SB(s), the flow proceeds to S86 to store SB(s) in a register for currently operated operator "op". The selecting button SB(s), which is not shown in FIG. 5 and FIG. 6, is a button for selecting any one of three or more options, for example. Respective options have an operator which is displayed as a selecting button. The flow then proceed to S87 to set the current value CP (op) of the operators for the options such that the selecting button SB(s) stored in the register for current operator "op" is set to the selected state while other selecting buttons "op" included in the options are set to the non-selected state. Then at S88, display of the selecting buttons included in the options is refreshed between the selected state and non-selected state.

When the start coordinates ($x_0$, $y_0$) are located in the display area of the kth knob Kb(k), the flow proceeds to S89. At S89, the kth knob Kb(k) is stored in a register for currently operated operator "op", and the current parameter value CP (op) corresponding to the knob Kb (k) is stored in a register $CP_0$. At S90, display is refreshed to indicate that the knob Kb (k) is in the selected state. When the start coordinates ($x_0$, $y_0$) are located in the display area of the oth other operator Ot (o), the flow proceeds to S91. At S91, the oth other operator Ot(o) is stored in a register for currently operated operator "op". Then at S92, a process corresponding to the operator Ot (o) is performed.

FIG. 8 is a flowchart of a touch move event process. Every time occurrence of a touch move event shown in FIG. 2(b) and FIG. 2(c) is sensed, this process is started to renew the input of the coordinates (x, y) of a touched position. S101 determines which operator the current operator "op" stored in the register at the touch start event process shown in FIG. 7 is. When the operator is the tth toggle button TB(t), the flow proceeds to S102 to determine whether the input current coordinates (x, y) are located in the display area of the t'th toggle button TB(t') which is different from the display area of the tth toggle button TB(t). If not, the process is terminated. If so, the flow proceeds to S103 to store the t'th toggle button TB(t') in a register for a new operator "nop".

S104 determines whether the new operator "nop" belongs to the same group as the current operator "op". If not, the process is terminated. If so, the flow proceeds to S105 to copy the parameter value CP (op) corresponding to the current operator "op" to the parameter value CP (nop) corresponding to the new operator "nop". Then, at S106, display of the t'th toggle button TB(t') is refreshed to show the copied parameter value.

When the determination of S101 results in the current operator "op" being located in the display area of kth knob Kb (k), the flow proceeds to S107 to change, in accordance with a difference between the start coordinates ($x_0$, $y_0$) and the input current coordinates (x, y), the parameter value $CP_0$ (S89 of FIG. 7) corresponding to the kth knob Kb (k) on which the touch move event has been started. At S107, the changed value is then stored in the register for the current parameter value CP (op) assigned to the current operator "op". At S108, the display area of the kth knob Kb (k) which is the current operator "op" is refreshed to show the current parameter value CP (op).

FIG. 9 is a flowchart showing a touch finish event process. This process is started upon detection of occurrence of the touch finish event shown in FIG. 2 (d) to renew the coordinates (x, y) of a touched position. Step S121 determines which operator corresponds to the display area in which the start coordinates ($x_0$, $y_0$) (S81 of FIG. 7) are located. When the start coordinates ($x_0$, $y_0$) are located in the display area of the toggle button TB(t) or the selecting button SB(s), no processing will be performed. When the start coordinates ($x_0$, $y_0$) are located in the display area of the knob Kb(k), the flow proceeds to S122 to turn display of the knob Kb(k) into the non-selected state.

Next, a case in which the pre/post button is dragged on the touch screen shown in FIG. 5 will be explained. Suppose a case in which the user touches the pre/post button $61_{1,\,10}$, drags over the pre/post buttons $61_{1,\,10}$, $61_{2,\,10}$, drags over the sending-on buttons $62_{3,\,10}$, $62_{4,\,10}$, drags over the pre/post buttons $61_{5,\,10}$, $61_{6,\,10}$, and finishes the touch.

When the user touches the pre/post button $61_{1,\,10}$, the process shown in FIG. 7 is started. Due to the steps of S81, S82, and S83, the pre/post switch (PP) 50 for the channel (1) to the mix bus (10) is defined as the current operator. Then at S84, the parameter Pre (1, 10) of the pre/post switch (PP) 50 for the channel (1) to the mix bus (10) is reversed to turn from the on state to the off state. At S85, display of the pre/post button $61_{1,\,10}$ is dimmed from the shown brightness. Then, the process shown in FIG. 8 is periodically started. As long as the user drags over the same pre/post button $61_{1,\,10}$ or anywhere other than the display areas of the on/off buttons (toggle buttons), the flow exits at S102.

Then, if the user drags over the pre/post button $61_{2,\,10}$, the flow performs steps from S101 through S105 to copy the parameter Pre (1, 10) of the pre/post switch (PP) 50 for the channel (1) to the mix bus (10) to the parameter Pre (2, 10) of the pre/post switch (PP) 50 for the channel (2) to the mix bus (10). In this case, however, no change is made to the parameter Pre (2, 10), for the parameter Pre (2, 10) has been in the off state since before the copy. When the user then drags over the sending-on buttons $62_{3,\,10}$, $62_{4,\,10}$, the flow exits at S104, for the sending-on button 62 does not belong to the same group as the pre/post button 61.

If the user drags over the pre/post button $61_{5,\,10}$, the flow performs steps from S101 through S105 to copy the parameter Pre (1, 10) of the pre/post switch $50_{1,\,10}$ for the channel (1) to the mix bus (10) to the parameter Pre (5, 10) of the pre/post switch $50_{5,\,10}$ for the channel (5) to the mix bus (10) to turn the parameter Pre (5, 10) to the off state. At S106, display of the pre/post button $61_{5,\,10}$ is dimmed.

Next, a case in which the user touches the stereo button $72_1$, drags over the LCR buttons $75_2$ through $75_5$, and drags to the stereo button $72_6$ on the touch screen shown in FIG. 6 will be explained. When the user touches the stereo button $72_1$, the process shown in FIG. 7 is started. Due to the steps of S81, S82, and S83, the "TO ST" switch 48 is defined as the current operator "op". Then at S84, the on/off parameter of the "TO ST" switch 48 for the channel (1) is reversed to turn from the on state to the off state. At S85, display of the stereo button $72_1$ is dimmed. Then, the process shown in FIG. 8 is periodically started. As long as the user drags over the same stereo button $72_1$ or anywhere other than the display areas of the on/off buttons, the flow exits at S102.

Then, if the user drags over the LCR button $75_2$, the flow performs steps from S101 through S104. At S104, the flow exits, for the LCR button 75 does not belong to the same group as the stereo button 72. If the user drags over the stereo button $72_6$, the flow performs steps S101, S102, S103, S104 and S105 to copy the parameter of the "TO ST" switch 48 for the channel (1) to the parameter of the "TO ST" switch 48 for the channel (6) to turn to the off state. At S106, display of the stereo button $72_6$ is dimmed.

In the above-described flowchart, the copy in S105 and the refresh of display in S106 may be omitted in cases where copy of the parameter in S105 results in no change in the target parameter. Furthermore, step S102 may be modified such that a negative determination is unconditionally made as long as the coordinates (x, y) of the current operator are located in the same display area as that of the previous event process. In this modified S102, a determination whether or not the current operator is located in the area of a different TB (t') is made only when the current operator enters a different display area. The above-described modifications cause no substantial change in the behavior of the mixer, only eliminating unnecessary processes of S103 to S106.

The above-described displaying of set values on the touch screen and copying of the values can be adapted to various operators. In a case where a plurality of buttons classified under a plurality of groups are provided for respective input channels, for example, the establishing of one or more DCA groups or the establishing of one or more MUTE groups can be done by operating these buttons. More specifically, if the user touches a button assigned to one channel to include in a group and then drags over a button assigned to another channel, the another channel is also included in the group in which the one channel is included. Similarly, if the user touches a button assigned to one channel to exclude from a group and then drags over a button assigned to another channel, the another channel is also excluded from the group from which the one channel is excluded. In addition to a fader provided in the operating area of the respective input channels, a plurality of DCA faders are arranged in the operating panel. The gain indicated by the channel fader of an input channel is added to the gain indicated by the DCA fader of a DCA group to which the input channel belongs. On the basis of the resultant gain (dB), the input channel is controlled. The input channels are allowed to simultaneously belong to a plurality of DCA groups. On a display screen for setting DCA groups (not shown), therefore, each column for each input channel has lines (e.g., eight lines) of on/off buttons for setting a plurality of DCA groups (e.g., 1 through 8) to form a matrix as a whole.

The user is allowed to add channels to a DCA group by a simple procedure: touching the on/off button of a DCA group of a channel in order to include the channel in the DCA group (parameter turns to the on state) and then dragging over an on/off button of the same DCA group of another channel to add the another channel to the DCA group. During the dragging, even if the user drags over an on/off button of a DCA group which is different from the DCA group which the user has touched first, the dragging over the on/off button of the different group is not considered as an operating error, for the dragged on/off button belongs to a different DCA group. If the user touches the on/off button (parameter is in the on state) of a DCA group in which an input channel has been already added, furthermore, the input channel is excluded from the DCA group to turn the parameter to the off state. After the exclusion, user's dragging over on/off buttons of the DCA group causes input channels corresponding to the on/off buttons to be simultaneously excluded from the DCA group.

MUTE groups are provided to allow the user to control, through the use of a MUTE switch of a MUTE group, the on/off of the mute of input channels belonging to the MUTE group. On a touch screen for setting the MUTE groups, therefore, a matrix similar to that for setting DCA groups is provided. In the case of the setting of MUTE groups as well, the procedure of touching and dragging enables simultaneous inclusion of input channels in a MUTE group or simultaneous exclusion of input channels from a MUTE group.

In addition to the above, on a touch screen for setting a parameter of the compressor 43 shown in FIG. 4 for a plurality of channels as well, buttons for switching the insertion of a compressor are provided for the input channels to enable the user to simultaneously specify the on/off state of the input channels by the procedure of touching and dragging. In addition, the digital audio mixer is provided with a capability for setting threshold level of the compressor in combination with the setting of ratio of the compressor or the like. On a touch screen, auto-buttons for setting the capability for the respective input channels are displayed. In the case of the auto-buttons as well, the procedure of touching and dragging enables the user to simultaneously specify the on/off state of the plurality of auto-buttons. Since the on/off buttons for inserting a compressor belong to an operator group different from that of the auto-buttons, no influence is exerted on each other.

As described above, the digital audio mixer has various on/off buttons on the touch screen for specifying the on/off state (two options are provided for respective parameters). In cases where the user desires to simultaneously set a plurality of on/off buttons, the present invention facilitates user's touch operation. In cases where a plurality of groups are provided according to the types of parameters with individual on/off buttons belonging to any one of the groups (including a case where only one on/off button is included in a group), more specifically, the present invention enables the user to simultaneously set a plurality of on/off buttons for each group.

In carrying out the present invention, furthermore, it will be understood that the present invention is not limited to the above-described embodiment, but various modifications may be made without departing from the spirit and scope of the invention. In addition to the digital audio mixer, for instance, the present invention can be adapted to various apparatuses which also require to set the on/off state of a plurality of parameters in a group such as electronic musical instruments and intelligent home appliances.

What is claimed is:

1. A parameter setting apparatus provided with a display unit having a touch sensor for sensing touch operation on a display screen and position of the touch, the parameter setting apparatus comprising:
an image outputting portion for outputting, to the display unit, an image on which a plurality of on/off buttons to each of which an on/off parameter is assigned are displayed;
an on/off parameter setting portion for reversing, when it is determined on the basis of output from the touch sensor that the touch operation has been started in an area of any one of the on/off buttons displayed on the display screen by the image outputting portion, on/off state of the on/off parameter assigned to the one on/off button; and
an on/off parameter copying portion for setting, when it is determined on the basis of output from the touch sensor that, after the start of the touch operation, the touched position has moved to an area of another on/off button displayed on the display screen with the touch on the display screen being maintained, on/off state of the on/off parameter assigned to the another on/off button to the same on/off state as that of the on/off parameter assigned to the one on/off button in the area of which the touch operation has been started.

2. A parameter setting apparatus according to claim 1 wherein the parameter setting apparatus is applied to an audio mixer which mixes a plurality of audio signals and outputs the mixed signals.

3. A parameter setting apparatus according to claim 1 wherein each of the on/off buttons belongs to any one of groups provided according to types of the on/off parameters; and the on/off parameter copying portion sets, on condition that the another on/off button belongs to the same group as the one on/off button in the area of which the touch operation has been started, on/off state of the on/off parameter assigned to the another on/off button to the same on/off state as that of the on/off parameter assigned to the one on/off button in the area of which the touch operation has been started.

4. A parameter setting apparatus according to claim 1 wherein when on/off state of an on/off parameter is reversed, the image outputting portion outputs, to the display unit, an image in which display of on/off buttons is changed in accordance with the reversed on/off state.

5. A non transitory computer readable storage medium comprising processor executable instructions, said instructions, while executed, causing a parameter setting apparatus, provided with a display unit having a touch sensor for sensing touch operation on a display screen and position of the touch, to perform:
an image outputting step for outputting, to the display unit, an image on which a plurality of on/off buttons to each of which an on/off parameter is assigned are displayed;
an on/off parameter setting step for reversing, when it is determined on the basis of output from the touch sensor that the touch operation has been started in an area of any one of the on/off buttons displayed on the display screen by the image outputting step, on/off state of the on/off parameter assigned to the one on/off button;
and an on/off parameter copying step for setting, when it is determined on the basis of output from the touch sensor that, after the start of the touch operation, the touched position has moved to an area of another on/off button displayed on the display screen with the touch on the display screen being maintained, on/off state of the on/off parameter assigned to the another on/off button to the same on/off state as that of the on/off parameter assigned to the one on/off button in the area of which the touch operation has been started.

* * * * *